(12) United States Patent
Beveridge (10) Patent No.: US 10,167,708 B2
(45) Date of Patent: Jan. 1, 2019

(54) AUTOMATIC Y-TOOL

(71) Applicant: GE Energy Oilfield Technology, Inc., Broussard, LA (US)

(72) Inventor: William Alexander Beveridge, Aberdeen (GB)

(73) Assignee: GE Energy Oilfield Technology, Inc., Broussard, LA (US)

( * ) Notice: Subject to any disclaimer, the term of this patent is extended or adjusted under 35 U.S.C. 154(b) by 272 days.

(21) Appl. No.: 15/148,816

(22) Filed: May 6, 2016

(65) Prior Publication Data

US 2017/0306732 A1    Oct. 26, 2017

Related U.S. Application Data

(60) Provisional application No. 62/326,826, filed on Apr. 24, 2016.

(51) Int. Cl.
| | | |
|---|---|---|
| *E21B 43/12* | (2006.01) | |
| *E21B 23/12* | (2006.01) | |
| *F04B 15/00* | (2006.01) | |
| *F04B 49/24* | (2006.01) | |
| *F04B 53/10* | (2006.01) | |
| *F04D 1/00* | (2006.01) | |
| *F04D 15/00* | (2006.01) | |
| *F04D 29/44* | (2006.01) | |
| *F04C 14/26* | (2006.01) | |

(Continued)

(52) U.S. Cl.
CPC .......... *E21B 43/128* (2013.01); *E21B 23/002* (2013.01); *E21B 2034/002* (2013.01); *E21B 2034/007* (2013.01); *F04B 15/00* (2013.01); *F04B 49/24* (2013.01); *F04B 53/1002* (2013.01); *F04C 14/26* (2013.01); *F04D 1/00* (2013.01); *F04D 13/10* (2013.01); *F04D 15/0011* (2013.01); *F04D 29/445* (2013.01); *F16K 5/06* (2013.01); *F16K 15/044* (2013.01); *F16K 31/12* (2013.01)

(58) Field of Classification Search
CPC ............................. E21B 43/128; E21B 23/002
See application file for complete search history.

(56) References Cited

U.S. PATENT DOCUMENTS

| | | |
|---|---|---|
| 5,975,209 A | 11/1999 | McCorry |
| 6,497,278 B1 | 12/2002 | Norris |

(Continued)

FOREIGN PATENT DOCUMENTS

| | | |
|---|---|---|
| WO | 2007/026141 A1 | 3/2007 |
| WO | WO2014177881 | 11/2014 |

OTHER PUBLICATIONS

International Search Report and Written Opinion issued in connection with corresponding PCT Application No. PCT/US2017/29139 dated Jul. 21, 2017.

*Primary Examiner* — D. Andrews
*Assistant Examiner* — Kristyn A Hall
(74) *Attorney, Agent, or Firm* — Crowe & Dunlevy, P.C.

(57) ABSTRACT

A Y-tool is configured for use with a pumping system that includes an electric submersible pump and bypass tubing. The Y-tool includes a slave valve assembly that controls access to the bypass tubing. The Y-tool also includes a master valve assembly driven by pressure from the electric submersible pump and a linkage assembly connected between the master valve assembly and the slave valve assembly.

19 Claims, 9 Drawing Sheets

(51) Int. Cl.
*F16K 5/06* (2006.01)
*F16K 31/12* (2006.01)
*F16K 15/04* (2006.01)
*E21B 34/00* (2006.01)
*F04D 13/10* (2006.01)

(56) References Cited

U.S. PATENT DOCUMENTS

| | | |
|---|---|---|
| 6,508,308 B1 | 1/2003 | Shaw |
| 8,104,540 B2 | 1/2012 | Leitch |
| 2006/0231256 A1* | 10/2006 | Rivas .................... E21B 43/128 166/297 |
| 2009/0200034 A1* | 8/2009 | Leitch ................... E21B 23/002 166/321 |
| 2013/0277064 A1 | 10/2013 | Xiao et al. |
| 2016/0076336 A1 | 3/2016 | Jordan |

* cited by examiner

AUTOMATIC Y-TOOL

RELATED APPLICATIONS

This application claims the benefit of U.S. Provisional Patent Application No. 62/326,826, filed Apr. 24, 2016 entitled "Automatic Y-Tool," the disclosure of which is incorporated herein.

FIELD OF THE INVENTION

This invention relates generally to the field of submersible pumping systems, and more particularly, but not by way of limitation, to an improved Y-tool.

BACKGROUND

Submersible pumping systems are often deployed into wells to recover petroleum fluids from subterranean reservoirs. Typical submersible pumping systems include a number of components, including one or more fluid filled electric motors coupled to one or more high performance pumps located above the motor. The collection of these components is often referred to as an electric submersible pump, or "ESP." When energized, the motor provides torque to the pump, which pushes wellbore fluids to the surface through production tubing. Each of the components in a submersible pumping system must be engineered to withstand the inhospitable downhole environment.

The pumping system can either be directly in the production tubing or located in parallel with bypass tubing. In this second arrangement a Y-tool is located in the production tubing wherein the ESP is supported from a first limb and the bypass tubing is supported from the second limb. The parallel arrangement is used when equipment needs to be run to a location below the ESP in the well.

When the ESP is operated, a blanking plug is typically installed in the bypass tubing to prevent pumped fluids from being re-circulated through the by-pass tubing back into the well. The use of the blanking plug requires a workover rig that is expensive and time consuming. Another disadvantage is that in normal operations, a shut-down of the pump would allow the fluid column in the production tubing above the Y-tool to drain back through the pump, possibly causing reverse rotation of the pump and allowing solids to settle in the pump.

Although traditional bypass systems have been used with success for many years, there remains a need for an improved Y-tool that exhibits improved performance and reliability while permitting efficient intervention without high workover costs. It is to these and other objects that the present invention is directed.

SUMMARY OF THE INVENTION

In exemplary embodiments, a Y-tool is configured for use with a pumping system that includes an electric submersible pump and bypass tubing. The Y-tool includes a slave valve assembly that controls access to the bypass tubing. The Y-tool also includes a master valve assembly driven by pressure from the electric submersible pump and a linkage assembly connected between the master valve assembly and the slave valve assembly.

In another aspect, the Y-tool includes an upper master valve bore, a lower master valve bore and a master valve contained within the upper master valve bore and the lower master valve bore. The master valve includes a fixed flow sleeve, a sliding flow sleeve, and a floating check valve assembly. The Y-tool also includes a discharge bore, a slave valve bore and a slave valve assembly within the slave valve bore. The slave valve includes a rotary ball valve. The Y-tool includes a production passage connected between the upper master valve bore and the discharge bore. A linkage assembly connected between the sliding flow sleeve and the rotary ball valve rotates the rotary ball valve between open and closed positions in response to the linear movement of the sliding flow sleeve.

In yet another aspect, a Y-tool includes a slave valve assembly that has a rotary ball valve. The Y-tool also includes a master valve assembly driven by pressure from an electric submersible pump. The master valve assembly includes a sliding flow sleeve, a floating check valve assembly, and a linkage assembly. The linkage assembly is connected between the sliding flow sleeve and the rotary ball valve and is configured to rotate the rotary ball valve in response to linear movement of the sliding flow sleeve.

DETAILED DESCRIPTION

Figure 1:
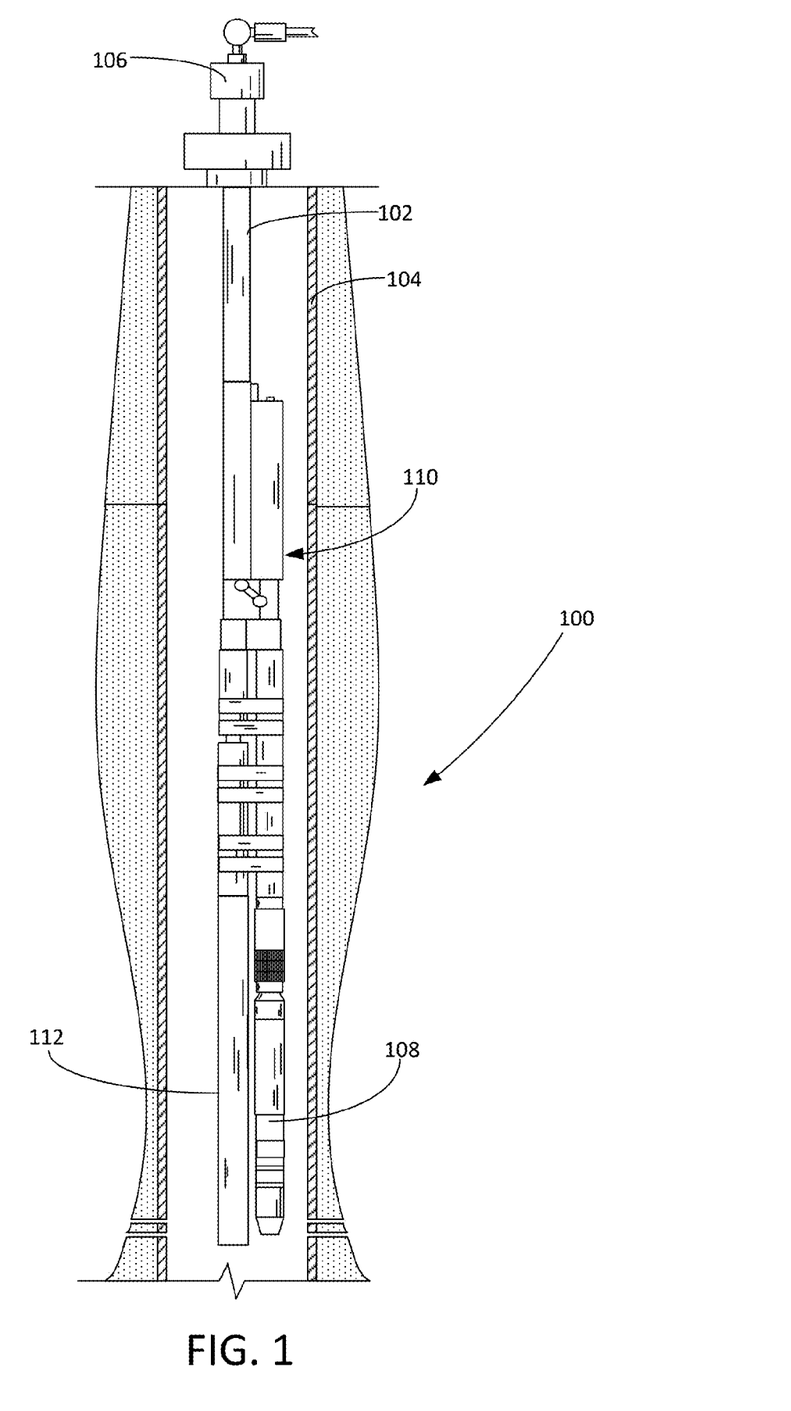
FIG. 1 is an elevational view of the submersible pumping system with a Y-tool constructed in accordance with an embodiment of the present invention.

In accordance with an embodiment of the present invention, FIG. 1 shows an elevational view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface.

The pumping system 100 includes an electric submersible pump 108, a Y-tool 110 and bypass tubing 112. The electric submersible pump 108 may include an electric motor, pump, seal section and other components and modules routinely found in submersible pumps. It will be appreciated that the electric submersible pump 108 may include a centrifugal pump or a positive displacement pump. Generally, the electric submersible pump 108 drives fluids from the wellbore 104 to the surface through the production tubing 102.

The electric submersible pump 108 and bypass tubing 112 are connected to the Y-tool 110, which is in turn connected to the production tubing 102. The Y-tool 110 selectively provides access to the wellbore 104 through the bypass tubing 112 while providing a conduit for production of fluids from the electric submersible pump 108. As illustrated in FIG. 1, the Y-tool 110 is configured such that the electric submersible pump 108 is offset from the production tubing 102. The bypass tubing 112 may be banded or otherwise attached to the electric submersible pump 108 below the Y-tool 110.

Figures 2, 3:
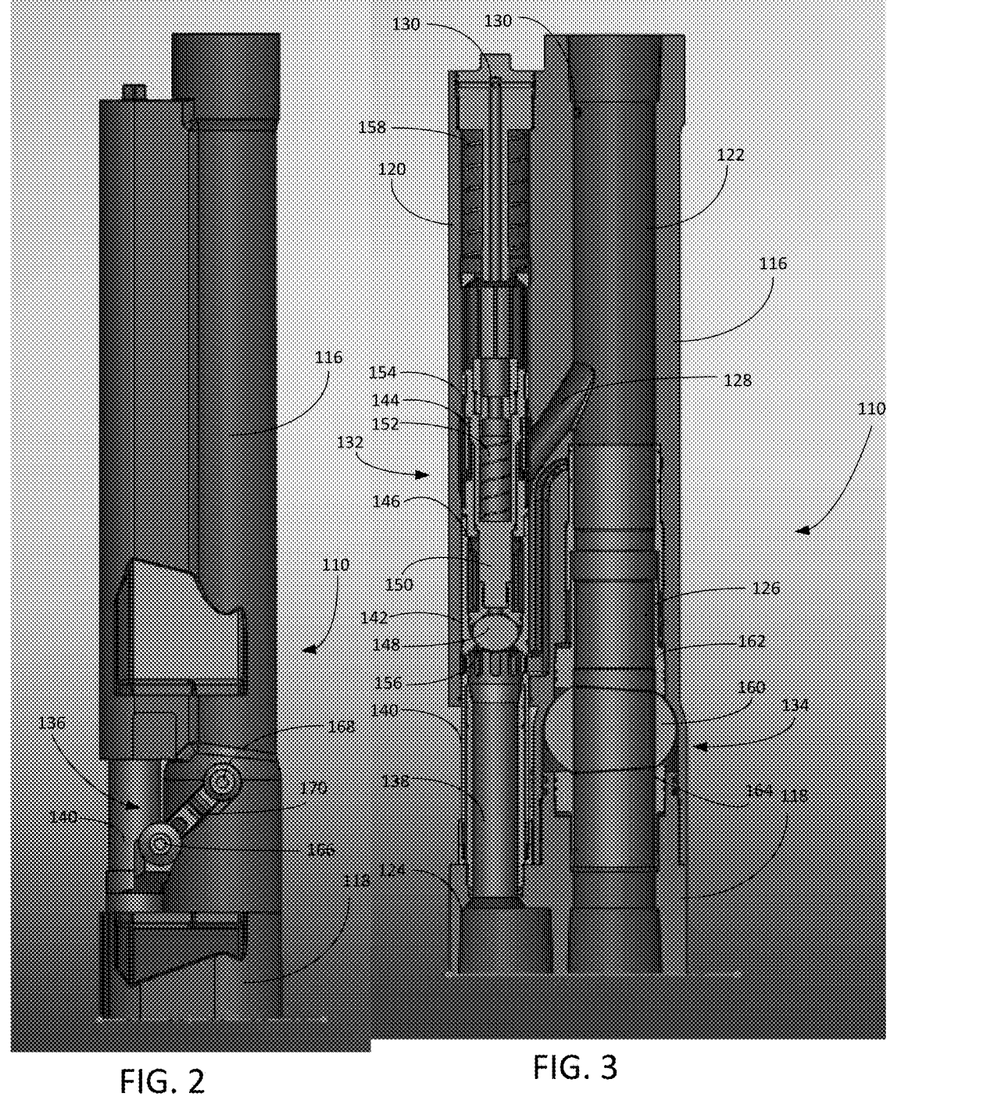
FIG. 2 is a side view of the Y-tool from the pumping system of FIG. 1 in a production closed position.
FIG. 3 is a side cross-sectional view of the Y-tool from the pumping system of FIG. 2.

Turning to FIGS. 2 and 3, shown therein are side and cross-sectional views, respectively, of the Y-tool 110. The Y-tool 110 includes a main housing 114 that includes an upper housing 116 and a lower housing 118. The upper housing 116 includes an upper master valve bore 120 above the electric submersible pump 108 and a discharge bore 122 above the bypass tubing 112. The lower housing 118 includes a lower master valve bore 124 and a slave valve bore 126 above the bypass tubing 112. The Y-tool 110 further includes a production passage 128 that connects the upper master valve bore 120 with the discharge bore 122. The upper master valve bore 120 and the discharge bore 122 are placed in fluid communication with one another through vents 130 to equalize pressures across the upper housing 116.

The Y-tool 110 includes a master valve assembly 132, a slave valve assembly 134 and linkage assembly 136. Generally, the master valve assembly 132 is a check valve that is linearly displaced within the upper master valve bore 120 in response to pressure created by the electric submersible pump 108. The slave valve assembly 134 includes a rotary valve that selectively opens and closes access to the bypass tubing 112. As the master valve assembly 132 lifts, the linkage assembly 136 rotates the slave valve assembly 134 into a "closed" position. As the master valve assembly 132 falls, the linkage assembly rotates the slave valve 136 to an "open" position.

The master valve assembly 132 includes a fixed flow sleeve 138 connected to the lower housing 118. The fixed flow sleeve 138 is aligned and concentric with the upper master valve bore 120. The master valve assembly 132 also includes a sliding flow sleeve 140 positioned externally and concentrically over the fixed flow sleeve 138 to permit the sliding flow sleeve 140 to slide over the fixed flow sleeve 138. Internal seals (not separately designated) or mating machined surfaces prevent fluid from escaping through the interface between the fixed flow sleeve 138 and the sliding flow sleeve 140. When deployed, the sliding flow sleeve 140 extends upward into the upper master valve bore 120.

The master valve assembly 132 also includes an interlocked upper sliding sleeve 142 and a floating check valve assembly 144. The upper sliding sleeve 142 is connected to the top of the sliding flow sleeve 140 through a threaded connection. The upper sliding sleeve 142 includes a plurality of radial flow slots 146.

The floating check valve assembly 144 includes a check ball 148, a piston 150, a damper 152, dogs 154 and a check ball seat 156. The check ball assembly 144 is held in a closed position in which the piston 150 and damper 152 press the check ball 148 against the check ball seat 156. When the spring-loaded dogs 154 are released outward into a corresponding groove within the upper master valve bore 120, the check ball assembly 144 is permitted to axially translate within the upper sliding sleeve 142.

When the floating check valve assembly 144 is locked, a sufficiently high pressure below the seated check ball 148 will cause the sliding flow sleeve 140, upper sliding sleeve 142 and check ball assembly 144 to move upward into the upper master valve bore 120 against the force exerted by a return spring 158. When the sliding flow sleeve 140 reaches the top of its stroke, the dogs 154 extend outward into a mating groove within the upper master valve bore 120, thereby releasing the floating check valve assembly 144. The check ball 148 is then permitted to lift from the check ball seat 156 and compress the piston 150 against the damper 152. In this position, the entire master valve assembly 132 is then locked into the deployed position in which the check valve assembly 144 is in an open position permitting fluid flow into the upper sliding sleeve 142 and the radial flow slots 146 are in alignment with the production passage 128 to permit the discharge of fluid into the discharge bore 122.

The master valve assembly 132 is biased in a closed position by the return spring 158. The combined force exerted by the return spring 158 and fluid pressure acting on top of the seated check ball 148 will force dogs 154 to retract and the master valve assembly 132 to drop back into a closed position. Thus, when flow from the electric submersible pump 108 stops, the damper 152 and gravity will force the check ball 148 will return to the check ball seat 156. Additionally, pressure in the production tubing 102 and the discharge bore 122 acts directly on the floating check valve assembly 144 and the seated check ball 148. The top of the floating check valve assembly 144 has a larger area than the bottom of the floating check valve assembly 144, which imparts a net downward force to assist in returning the floating check valve assembly 144 into the closed position. Thus, tubing pressure can be used to force the floating check valve assembly 144 downward and force the Y-tool 110 into the "pump-off" orientation if the internal components fail to function properly.

The slave valve assembly 134 includes a rotating ball valve 160 coupled about a rotational axis to the discharge bore 122, perpendicular to the longitudinal axis of the slave valve bore 126. The slave valve assembly 134 includes upper and lower floating valve seats 162, 164 that are spring-loaded into contact with the ball valve 160. The valve seats 162, 164 are configured in a floating condition to ensure that pressure can be sealed against either an upward or downward direction, and to prevent pressure from building up between the valve seats 162, 164. The ball valve 160 is configured to rotate such that in one orientation its through-bore is in-line with the slave valve bore 126 and in another orientation it completely obstructs and seals off the bypass tubing 112.

The linkage assembly 136 includes a hinged yoke 166, a ball hinge pin 168 and a lever arm 170. The hinged yoke 166 is connected to the base of the sliding flow sleeve 140 with a slot-and-rotational hinge assembly. As the sliding flow sleeve 140 moves upward or downward, the hinged yoke 166 moves a first end of the lever arm 170. The second end of the lever arm 170 is connected to the ball hinge pin 168. As the first end of the lever arm 170 moves up or down, the second end exerts a corresponding torque on the ball hinge pin 168 that in turn causes the ball valve 160 to rotate between closed and open positions.

Figures 4, 5:
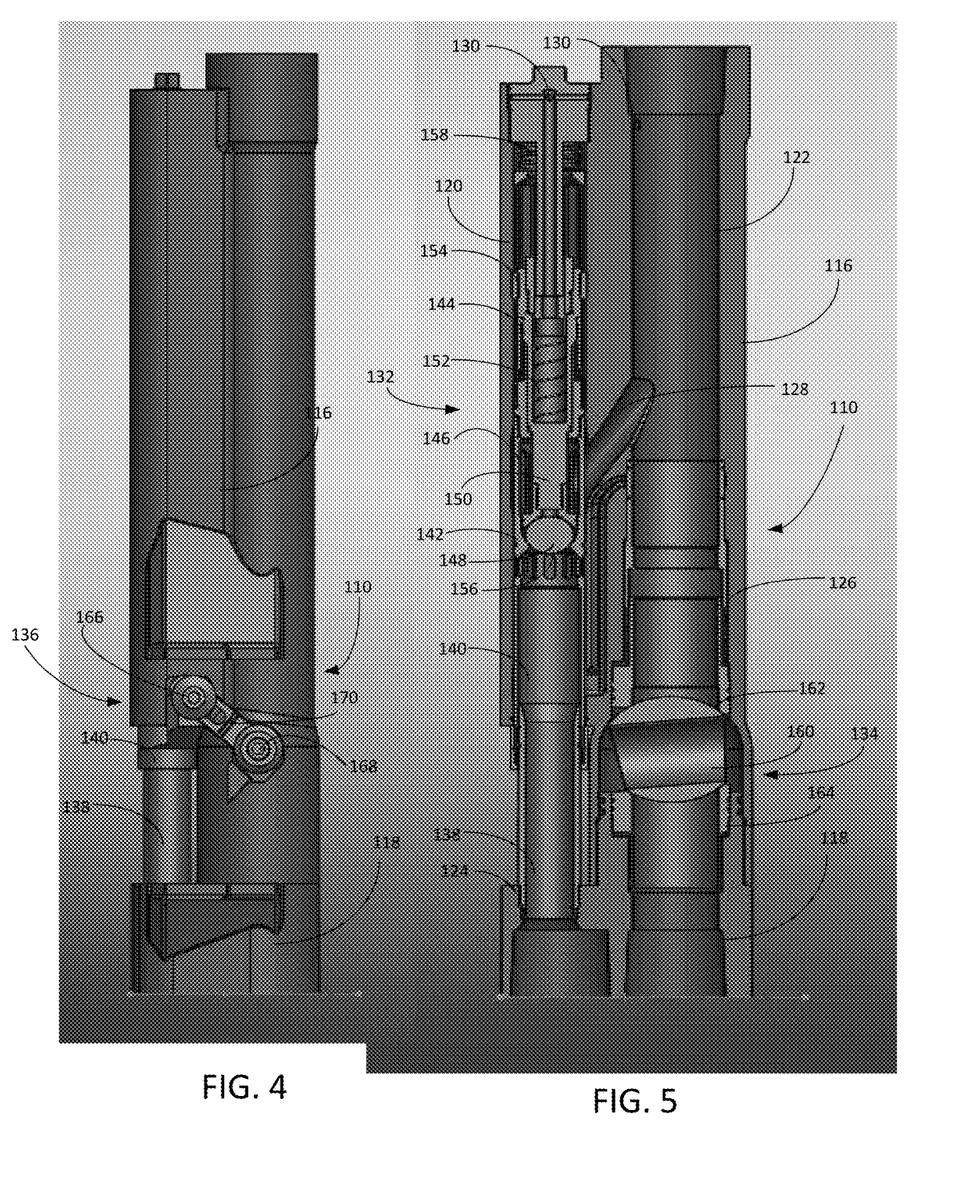
FIG. 4 is a side view of the Y-tool from the pumping system of FIG. 1 in a production open position.
FIG. 5 is a side cross-sectional view of the Y-tool from the pumping system of FIG. 4.

As depicted in FIGS. 2 and 3, the Y-tool 110 is in a position in which the ball valve 160 is open and providing access through the Y-tool 110 into the bypass tubing 112. In this position, the master valve assembly 132 is closed and there is no production from the electric submersible pump 108. Turning to FIGS. 4 and 5, shown therein are side and cross-sectional views, respectively, of the Y-tool 110 following the initial production of fluid from the electric submersible pump 108. In this condition, the pressure from the electric submersible pump 108 is lifting the sliding flow sleeve 140 and upper sliding sleeve 142 into the upper master valve bore 120. As the sliding flow sleeve 140 moves upward, the linkage assembly 136 rotates the ball valve 160 into a closed position. The radial flow slots 146 are aligned with the production passage 128, but flow is not permitted because the floating check valve assembly 144 remains in the closed position.

Figure 6:
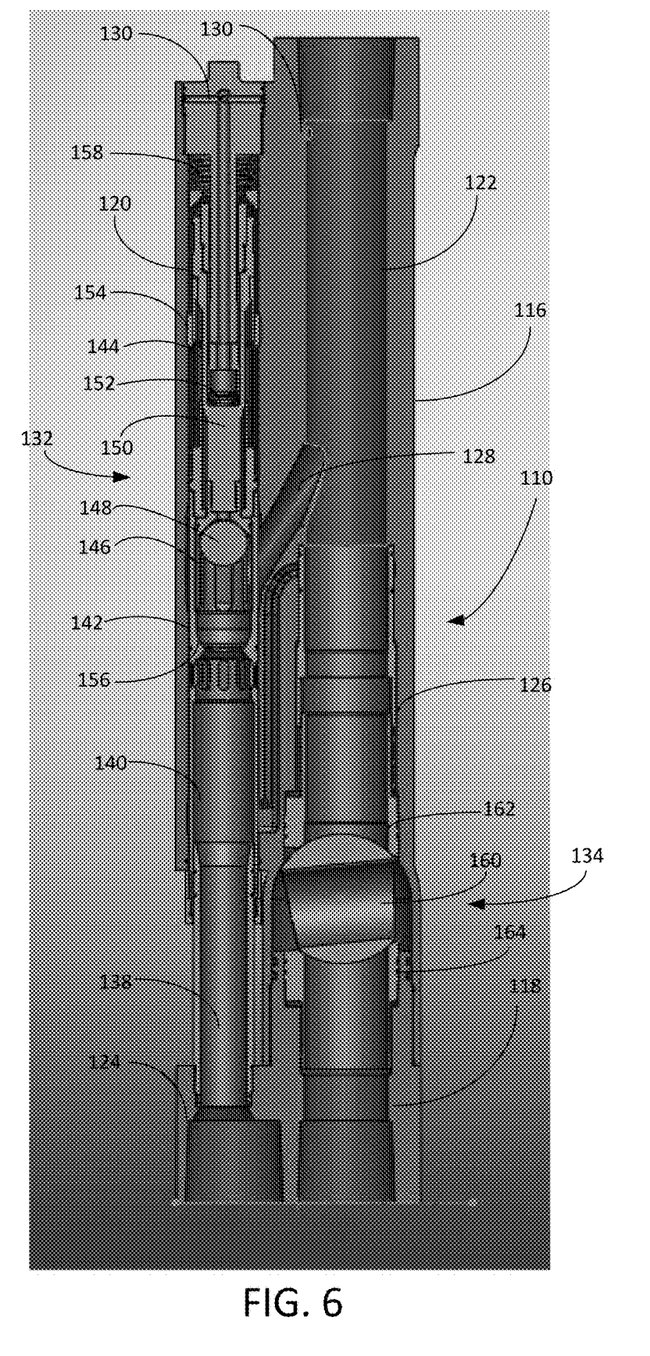
FIG. 6 is a side cross-sectional view of the Y-Tool in a producing position.

Turning to FIG. 6, the Y-tool 110 is depicted in a condition in which the dogs 154 have deployed and released the floating check valve assembly 144. The ball valve 160 remains in a closed position, but the check ball 148 lifts from the ball seat 156 and flow moves through the radial flow slots 146, through the production passage 128 and into the discharge bore 122. As depicted in FIG. 6, the Y-tool 110 is in a position in which the electric submersible pump 108 is operating and the bypass tubing 112 is isolated from the production tubing 102.

Figure 7:
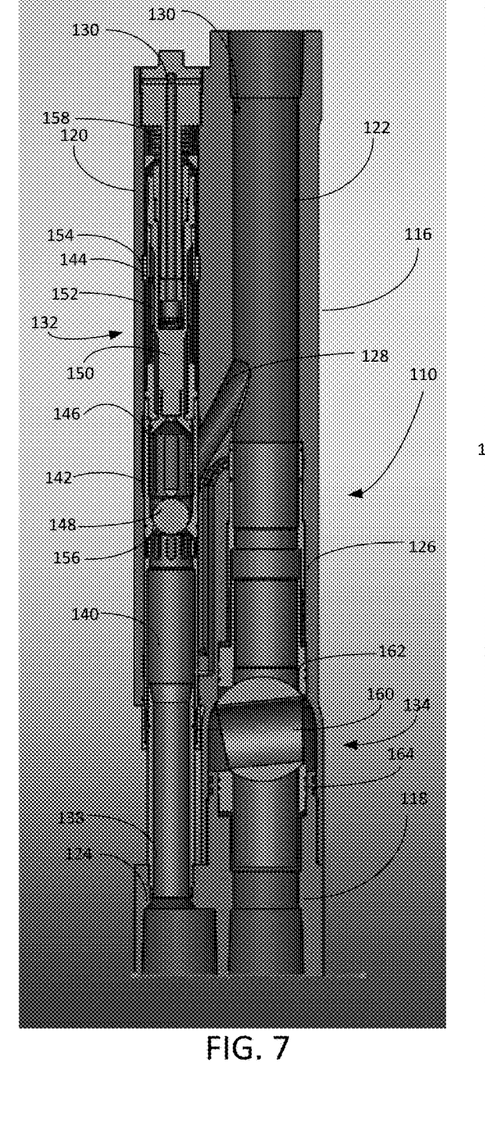
FIG. 7 is a side view of the Y-tool from the pumping system of FIG. 1 following pump shutdown.
Figure 8:
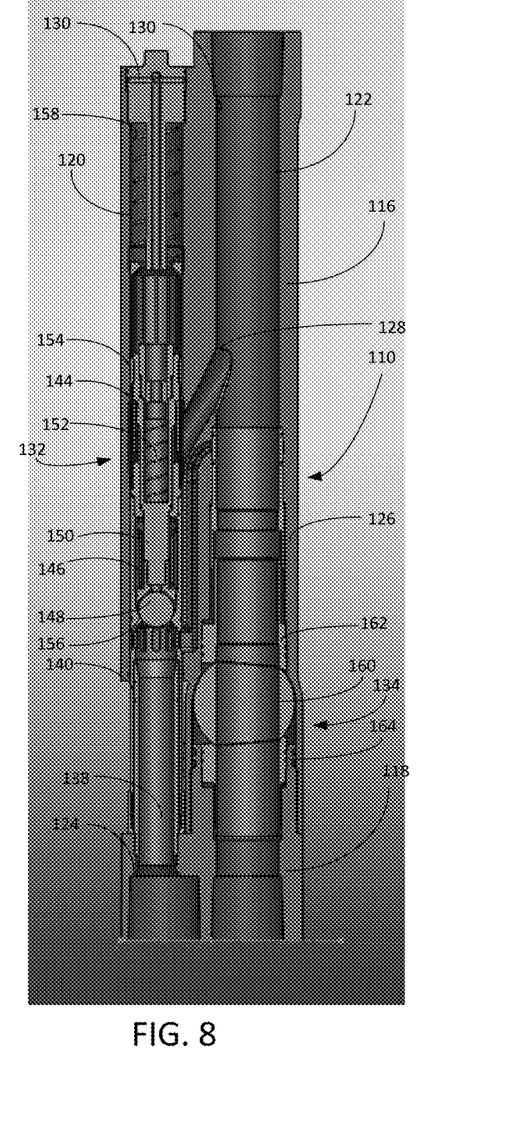
FIG. 8 is a side cross-sectional view of the Y-tool from the pumping system of FIG. 1 in a production closed position.

Turning to FIG. 7, shown therein is a cross-sectional depiction of the Y-tool 110 following the shutdown of the electric submersible pump 108. When flow from the electric submersible pump 108 stops, the check all 148 drops to the ball seat 156. Static pressure in the production tubing 102 and the return spring 158 force the master valve assembly 132 into a closed, retracted position. As the sliding flow sleeve 140 retracts, the linkage assembly 136 rotates the ball valve 160 back to the open position, as depicted in FIG. 8. Thus, the Y-tool 110 provides an automatic mechanism for switching between a production condition and a bypass condition by simply operating the electric submersible pump 108. Because the Y-tool 110 automatically isolates the electric submersible pump 108 when the electric submersible pump 108 is not in operation, sediment from the production tubing is not allowed to collect in the electric submersible pump 108.

There are certain situations in which it is desirable to operate the electric submersible pump 108 and also provide access to the wellbore 104 through the bypass tubing 112. For example, it may be desirable to conduct coiled-tubing logging operations while producing with the electric submersible pump 108. The Y-tool 110 is configured to accommodate these needs.

Figure 9:
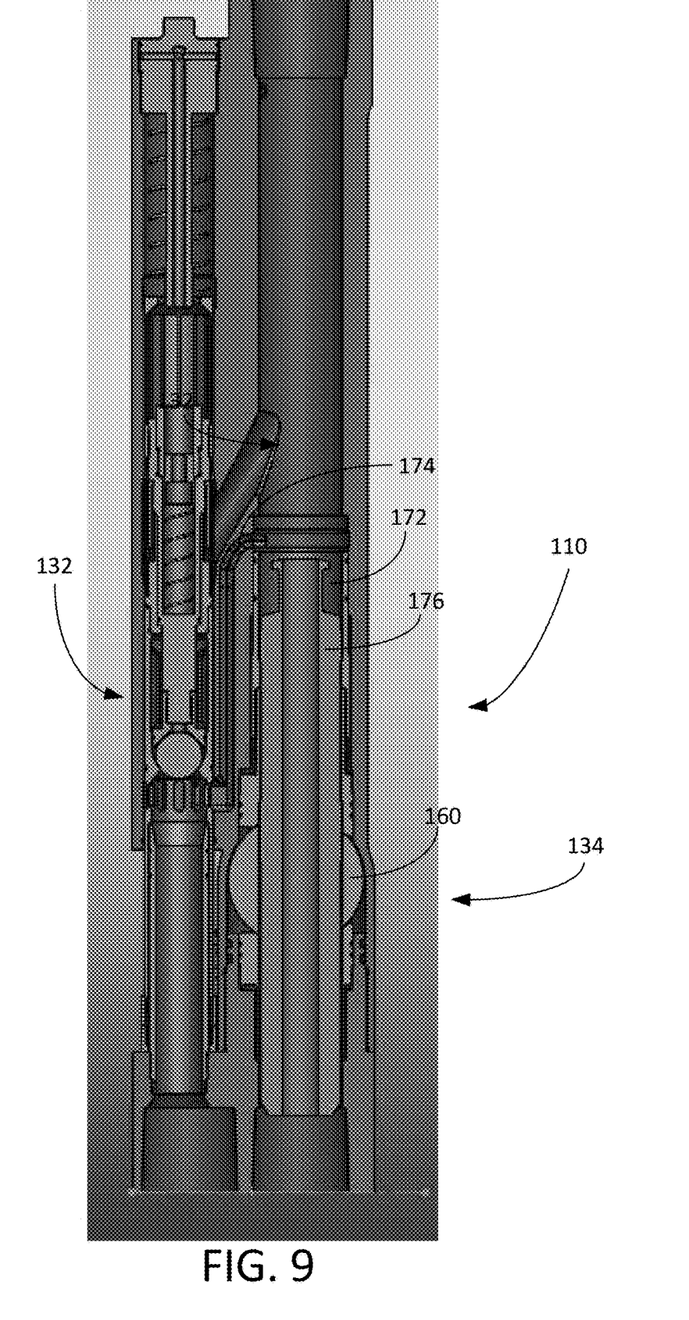
FIG. 9 is a side cross-sectional view of an alternate embodiment of the Y-tool in a producing position.
Figure 10:
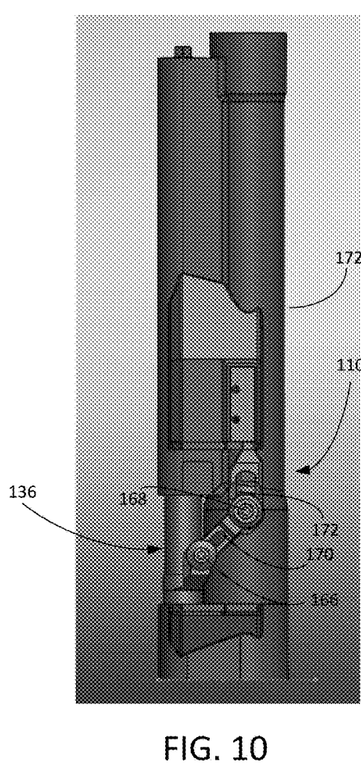
FIG. 10 is a side view of an additional alternate embodiment of the Y-tool from the pumping system of claim 1.
Figure 11:
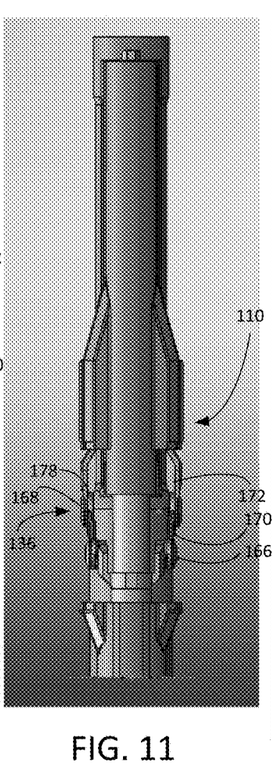
FIG. 11 is a front view of the Y-tool of FIG. 10.
Figure 12:
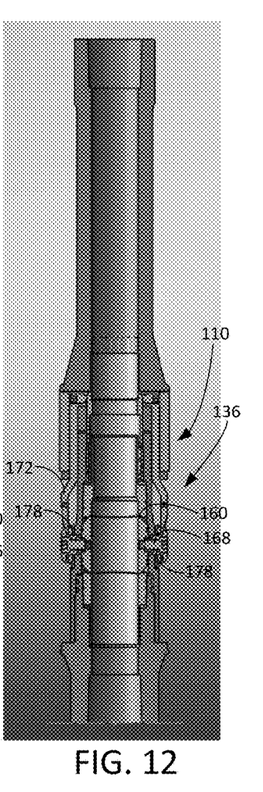
FIG. 12 is a front cross-sectional view of the Y-tool of FIG. 10.
Figures 13, 14:
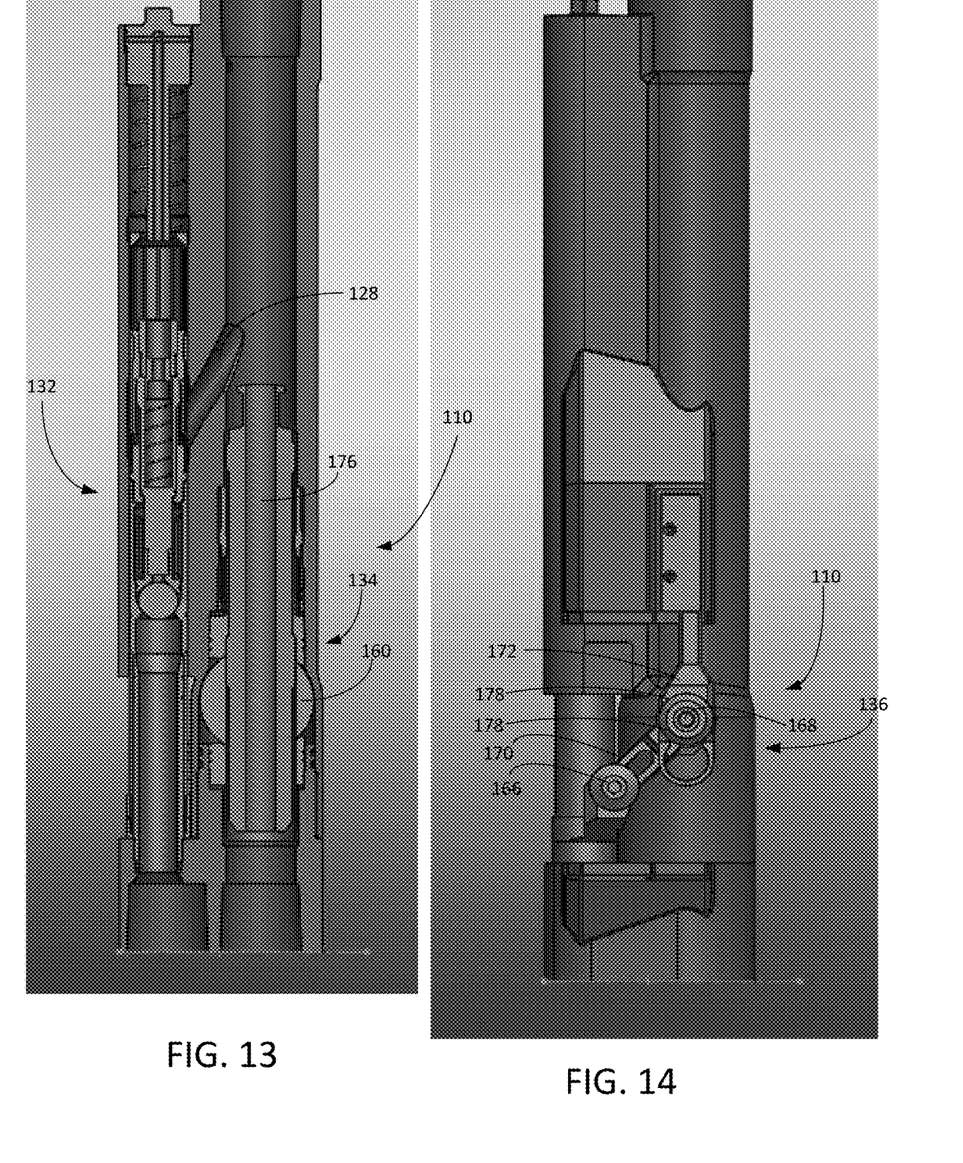
FIG. 13 is a side cross-sectional view of the Y-tool of FIG. 10.
FIG. 14 is a side view of the Y-tool of FIG. 10.
Figure 15:
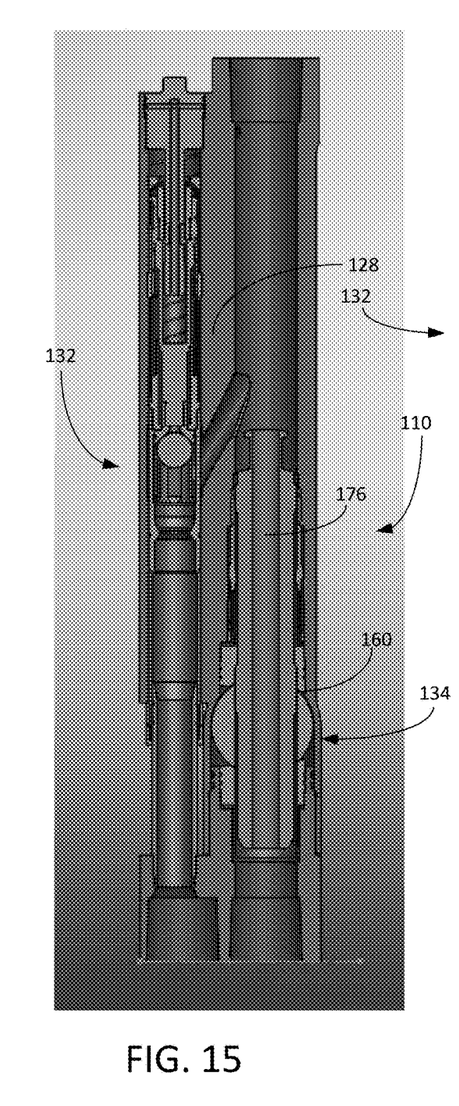
FIG. 15 is a side cross-sectional view of the Y-tool of FIG. 10 in a dual-open position.
Figure 16:
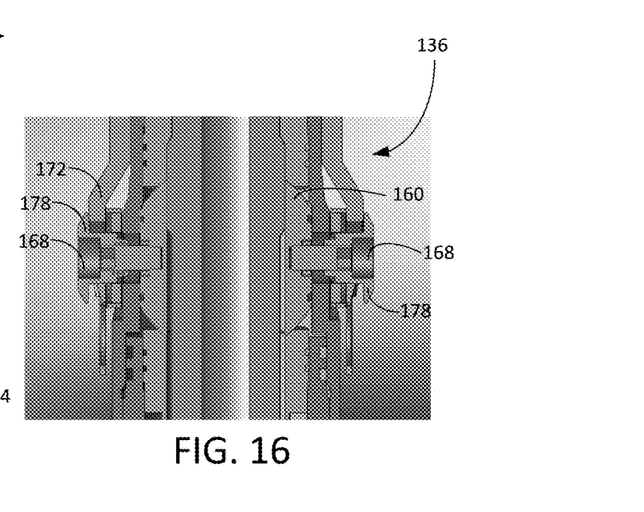
FIG. 16 is a front cross-sectional view of the clutch cams in a disengaged position.

Turning to FIG. 9, shown therein is a first embodiment of the Y-tool 110 that permits simultaneous access to the electric submersible pump 108 and bypass tubing 112. The Y-tool 110 includes a sliding sleeve 172 and an alternate production flow path 174. When a logging plug 176 extended through the Y-tool 110, the sliding sleeve 172 is retracted to permit flow through the alternate production flow path 174. The logging plug 176 also extends through the ball valve 160 to secure it in an open position. In this condition, master valve assembly 132 remains closed and production flow is routed through the alternate production flow path 174. At the end of the intervention, the logging plug 172 is retrieved and the sliding sleeve 172 closes the alternate production flow path 174.

Turning to FIGS. 10-16, shown therein are depictions of the Y-tool 110 constructed in accordance with another embodiment that permits simultaneous access to the electric submersible pump 108 and bypass tubing 112. In this embodiment, the linkage assembly 136 includes clutch cams 178 in contact with the ball hinge pins 168. The clutch cams 178 are activated by the sliding sleeve 172 and force the ball hinge pins 168 into a position in which they are allowed to rotate without rotating the ball valve 160. When the sliding sleeve 172 is deployed, the clutch cams 178 disengage the ball hinge pins 168. When production commences through the electric submersible pump 108, the sliding flow sleeve 140 will lift, but the linkage assembly 136 will not rotate the ball valve 160 into a closed position. Fluids produced by the electric submersible pump 108 will flow through the master valve assembly 132 and production passage 128, while the ball valve 160 remains in the open position to permit logging or other interventional activities. When the sliding sleeve 172 is retracted, the clutch cams 178 retract and the ball hinge pins 168 are returned to a locked position with the ball valve 160.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A Y-tool for use with a pumping system that includes an electric submersible pump and bypass tubing, the Y-tool comprising:
   a slave valve assembly comprising a rotary ball valve, wherein the slave valve assembly controls access to the bypass tubing;
   a master valve assembly driven by pressure from the electric submersible pump; and
   a linkage assembly connected between the master valve assembly and the rotary ball valve of the slave valve assembly, wherein the linkage assembly is connected between the master valve assembly and the rotary ball valve and configured to rotate the rotary ball valve in response to linear movement within the master valve assembly.

2. The Y-tool of claim 1, wherein the master valve assembly comprises:
   a sliding flow sleeve; and
   a floating check valve assembly.

3. The Y-tool of claim 2, wherein the linkage assembly is connected between the sliding flow sleeve and the rotary ball valve and configured to rotate the rotary ball valve in response to linear movement of the sliding flow sleeve.

4. The Y-tool of claim 2, further comprising:
   an upper master valve bore;
   a discharge bore; and
   a production passage connecting the upper master bore to the discharge bore.

5. The Y-tool of claim 4, wherein the master valve assembly further comprises:

an upper sliding sleeve connected to the sliding flow sleeve; and a plurality of extensible dogs, wherein the extensible dogs are configured to lock the master valve assembly in place within the upper master valve bore.

6. The Y-tool of claim 5, wherein the upper sliding sleeve comprises radial flow slots that permit flow through the master valve assembly when the radial flow slots are aligned with the production passage.

7. The Y-tool of claim 5, wherein the floating check valve assembly comprises:
a check ball;
a piston; and
a damper connected to the piston.

8. The Y-tool of claim 2, wherein the linkage assembly comprises:
a hinged yoke connected to the sliding flow sleeve;
one or more hinge pins connected for rotation with the ball valve; and
a lever arm connected between the hinged yoke and the one or more hinge pins.

9. The Y-tool of claim 8, wherein the linkage assembly further comprises clutch cams that selectively disengage the one or more hinge pins from the ball valve.

10. The Y-tool of claim 2, wherein the slave valve assembly further comprises:
an upper floating seal above the ball valve; and
a lower floating seal below the ball valve.

11. A Y-tool for use with a pumping system that includes an electric submersible pump and bypass tubing, the Y-tool comprising:
an upper master valve bore;
a lower master valve bore;
a master valve contained within the upper master valve bore and the lower master valve bore, wherein the master valve comprises:
a fixed flow sleeve;
a sliding flow sleeve; and
a floating check valve assembly;
a discharge bore;
a slave valve bore;
a slave valve assembly within the slave valve bore, wherein the slave valve comprises a rotary ball valve;
a production passage connected between the upper master valve bore and the discharge bore; and
a linkage assembly connected between the sliding flow sleeve and the rotary ball valve.

12. The Y-tool of claim 11, further comprising:
an alternate flow path between the upper master valve bore and the discharge bore; and
a sliding sleeve that selectively opens and closes the alternate flow path.

13. A Y-tool for use with a pumping system that includes an electric submersible pump and bypass tubing, the Y-tool comprising:
a slave valve assembly, wherein the slave valve assembly comprises a rotary ball valve;
a master valve assembly driven by pressure from the electric submersible pump, wherein the master valve assembly comprises:
a sliding flow sleeve; and
a floating check valve assembly; and
a linkage assembly, wherein the linkage assembly is connected between the sliding flow sleeve and the rotary ball valve and configured to rotate the rotary ball valve in response to linear movement of the sliding flow sleeve.

14. The Y-tool of claim 13, further comprising:
an upper master valve bore;
a discharge bore; and
a production passage connecting the upper master bore to the discharge bore.

15. The Y-tool of claim 14, further comprising:
an alternate flow path between the upper master valve bore and the discharge bore; and
a sliding sleeve that selectively opens and closes the alternate flow path.

16. The Y-tool of claim 13, wherein the master valve assembly further comprises:
an upper sliding sleeve connected to the sliding flow sleeve; and
a plurality of extensible dogs, wherein the extensible dogs are configured to lock the master valve assembly in place within the upper master valve bore.

17. The Y-tool of claim 16, wherein the upper sliding sleeve comprises radial flow slots that permit flow through the master valve assembly when the radial flow slots are aligned with the production passage.

18. The Y-tool of claim 17, wherein the floating check valve assembly comprises:
a check ball;
a piston; and
a damper connected to the piston.

19. The Y-tool of claim 13, wherein the linkage assembly further comprises clutch cams that selectively disengage the rotary ball valve from the sliding flow sleeve.

* * * * *